United States Patent
McDevitt et al.

(10) Patent No.: US 9,875,149 B2
(45) Date of Patent: Jan. 23, 2018

(54) PREVENTING SYNC INTERRUPTIONS

(71) Applicant: Microsoft Corporation, Redmond, WA (US)

(72) Inventors: Sarah McDevitt, Seattle, WA (US); Clement Fauchere, Sammamish, WA (US); Rick Duncan, Seattle, WA (US); Chris Whytock, Seattle, WA (US); Adrian Garside, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 1268 days.

(21) Appl. No.: 13/873,191

(22) Filed: Apr. 29, 2013

(65) Prior Publication Data

US 2014/0325379 A1  Oct. 30, 2014

(51) Int. Cl.
*G06F 9/52* (2006.01)
*H04L 29/08* (2006.01)

(52) U.S. Cl.
CPC .......... *G06F 9/526* (2013.01); *H04L 67/1095* (2013.01)

(58) Field of Classification Search
CPC ........ G06F 9/4443; G06F 3/0481; G06F 8/38; G06F 17/30905; H04L 29/08072
See application file for complete search history.

(56) References Cited

U.S. PATENT DOCUMENTS 5,937,414 A  8/1999  Souder et al.
6,594,774 B1 *  7/2003  Chapman .............. G06F 11/366
  714/2
7,950,014 B2  5/2011  Martinsen
8,359,290 B1  1/2013  Muthusrinivasan
(Continued)

FOREIGN PATENT DOCUMENTS

| EP | 1338968 A2 | 8/2003 |
| WO | 2001/06364 A2 | 1/2001 |
| WO | 2013016949 A1 | 2/2013 |

OTHER PUBLICATIONS

"International Search Report & Written Opinion for PCT Patent Application No. PCT/US2013/060772", dated Jan. 7, 2014, Filed Date: Sep. 20, 2013, 10 Pages.
(Continued)

*Primary Examiner* — Jeffrey A Gaffin
*Assistant Examiner* — Mandrita Brahmachari (57) ABSTRACT

Described herein are techniques performed by an application executing on a computing device. The application may have a graphical user interface (GUI) comprised of graphic objects displayed on a display of the computing device. The application may also have state data managed and stored by the application. The state data may specify features and layout of the GUI. The graphic objects may be displayed according to the state data. The application may dynamically adjust a threshold to different levels by monitoring user interactions with the GUI via an input device and setting the threshold to the different levels according to the user interactions with the GUI. Operations from an external source directed to the GUI are received. Each operation has a corresponding priority specific to the operation. The priorities and threshold levels are compared to determine whether to implement the operations.

19 Claims, 5 Drawing Sheets

(56) References Cited

U.S. PATENT DOCUMENTS

| | | | |
|---|---|---|---|
| 2002/0078257 A1* | 6/2002 | Nishimura | G06F 9/4812 |
| | | | 719/318 |
| 2002/0129096 A1 | 9/2002 | Mansour et al. | |
| 2005/0097543 A1* | 5/2005 | Hirayama | G06F 8/65 |
| | | | 717/168 |
| 2006/0045343 A1* | 3/2006 | Tremblay | G06K 9/00476 |
| | | | 382/186 |
| 2006/0282548 A1* | 12/2006 | Yoshida | G06Q 10/10 |
| | | | 710/1 |
| 2008/0154805 A1* | 6/2008 | Gurumoorthy | G06F 9/505 |
| | | | 706/12 |
| 2009/0327482 A1* | 12/2009 | Malhotra | G06F 15/173 |
| | | | 709/224 |
| 2010/0153604 A1 | 6/2010 | Peacock | |
| 2011/0078590 A1* | 3/2011 | Hao | G06Q 10/06 |
| | | | 715/755 |
| 2011/0090838 A1* | 4/2011 | Shaw | H04L 1/0026 |
| | | | 370/313 |
| 2011/0125832 A1* | 5/2011 | Dahl | G06F 11/3419 |
| | | | 709/203 |
| 2012/0030037 A1* | 2/2012 | Carriero | G06Q 30/02 |
| | | | 705/14.73 |
| 2012/0054640 A1 | 3/2012 | Nancke-Krogh | |

OTHER PUBLICATIONS

Jansen, Marc, "MatchMaker—A Framework to Support Collaborative Java Applications", In Proceedings of the 11th Conference on Artificial Intelligence in Education, Jan. 1, 2003, 6 Pages.

Brusilovsky, Peter, "Methods and Techniques of Adaptive Hypermedia", In User Modeling and User-Adapted Interaction, vol. 6, Issue 2-3, Jul. 1, 1996, pp. 87-129.

Umair., "Launchbar: A Powerful Application Launcher with Multi-Monitor Support", Retrieved at <<http://www.addictivetips.com/windows-tips/launchbar-a-powerful-application-launcher-with-multi-monitor-support/>>, Sep. 28, 2012, pp. 4.

Broski, Mark., "iOS 6 Tutorial Series: Syncing CoreData Across Devices Using iCloud", Retrieved at <<http://blogs.captechconsulting.com/blog/mark-broski/ios-6-tutorial-series-syncing-coredata-across-devices-using-icloud>>, Oct. 23, 2012, pp. 6.

"Office Action Issued in European Patent Application No. 13773981.9-1957", dated Aug. 29, 2016, 4 Pages.

* cited by examiner

PREVENTING SYNC INTERRUPTIONS

BACKGROUND

Cloud based computing has made it possible to duplicate aspects of user interfaces across devices. When users have multiple computing devices associated with a same online identity, application, service, platform, etc., it is often desirable to synchronize information between those devices to provide consistent or duplicate state for affiliated devices. In particular it may be desirable for aspects of a user interactive user interface to be consistent among a user's devices. This may be an issue because most user interfaces are alterable and customizable, either by a user or otherwise. A user may add a user interface element, move an element, change a behavior or appearance trait of the user interface, and so forth. For consistency, such changes may be propagated from the device where they originated to other devices with instances of the user interface.

For example, assume that a user has two computing devices. Each device has installed thereon an instance of an application program with a user interface. In addition, assume that there is a synchronization mechanism in place for changes to the user interface on either device to be propagated to the other device. Such a mechanism might be a peer-to-peer system or a network based service (e.g., a cloud service) that maintains state of the user interface (e.g., which elements are in the user interface, the layout of those elements, etc.). By whatever mechanism, changes to the user interface on one device are duplicated to the other device.

However, as uniquely observed by the inventors, user interface updates can be problematic. As observed by the inventors, because a user interface is by nature interactive, an update received while a user interface is likely to disrupt the user's activities directed to the user interface. The user may be in the midst of directing input to the user interface to perform an activity. That activity might be disrupted if an update to the in-use user interface is suddenly applied. For instance, if the user is dragging a graphic such as an application icon and an update causes the user interface to disrupt that dragging, the icon may end up being manipulated in a way not intended by the user.

Techniques related to minimizing such user disruptions are described below.

SUMMARY

The following summary is included only to introduce some concepts discussed in the Detailed Description below. This summary is not comprehensive and is not intended to delineate the scope of the claimed subject matter, which is set forth by the claims presented at the end.

Described herein are techniques performed by an application executing on a computing device. The application may have a graphical user interface (GUI) comprised of graphic objects displayed on a display of the computing device. The application may also have state data managed and stored by the application. The state data may specify features and layout of the GUI. The graphic objects may be displayed according to the state data. The application may dynamically adjust a threshold to different levels by monitoring user interactions with the GUI via an input device and setting the threshold to the different levels according to the user interactions with the GUI. Operations from an external source directed to the GUI are received. Each operation has a corresponding priority specific to the operation. The priorities and threshold levels are compared to determine whether to implement the operations.

Many of the attendant features will be explained below with reference to the following detailed description considered in connection with the accompanying drawings.

BRIEF DESCRIPTION OF THE DRAWINGS

The present description will be better understood from the following detailed description read in light of the accompanying drawings, wherein like reference numerals are used to designate like parts in the accompanying description.

DETAILED DESCRIPTION

Embodiments discussed below relate to managing how user interface updates are managed, whether from synchronization with another instance or whether such updates originate locally. To begin, user interface synchronization in general will be discussed. This will be followed by a discussion of an architecture that keys on user activity to regulate how and when updates are applied. Details of such embodiments are explained, followed by discussion of alternative embodiments and implementations.

Figure 1:
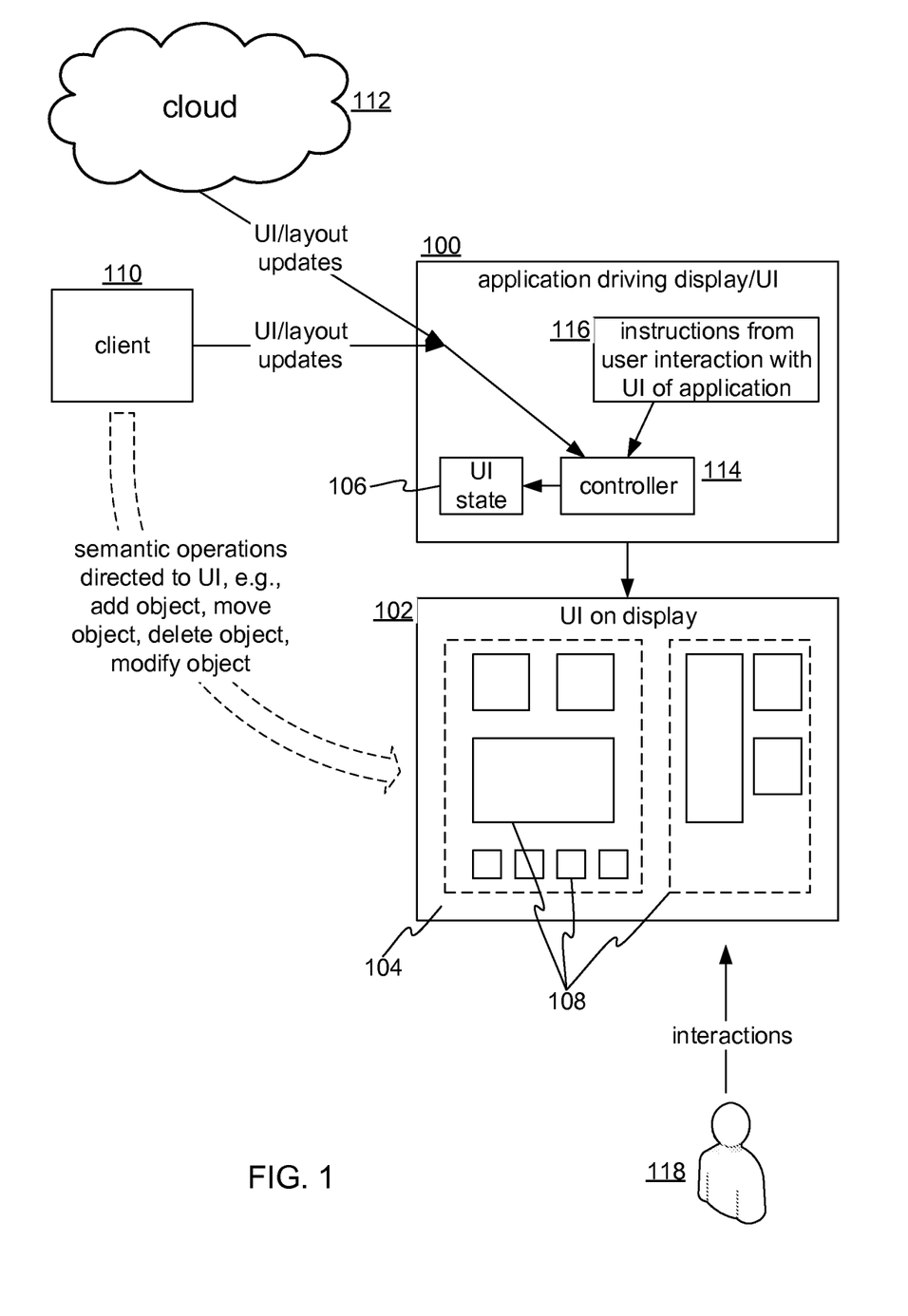
FIG. 1 shows an application and a user interface displayed on a display.

FIG. 1 shows an application 100 and display 102 displaying a user interface 104. The display 102 is part of any arbitrary computing device discussed later with reference to FIG. 5. The application 100 is installed on and executed by the computing device. The application 100 has user interface (UI) state 106 that controls the behavior and appearance of the user interface 104. The UI state might be in the form of a simple database or markup language file. The user interface 104 has user interface elements 108 such as application tiles or icons, menus, scrollable surfaces, lists of selectable items, application launching elements, information panels, or any other type of user interface element.

Many of the user interface elements 108 may be interactive. A user might provide input via an input device to actuate a user interface element 108, to move a user interface element 108, to type text into an element, to pan an element, to delete a user interface element 108, etc. As a user changes features of the user interface 106 such as layout (which elements are present or where), appearance, functionality, and so forth, the UI state 106 may be updated accordingly to reflect the state of the user interface 108. For example, if a user adds an icon for launching an application, or if the user changes a background image of the user interface 108, then the UI state 106 is updated to reflect those changes. If the application 100 is closed, upon being executed later the UI state may be read to enable the application 100 to rebuild (e.g., instantiate objects for user interface elements 108) and render the user interface 104.

As discussed in the Background, updates to the user interface 104 might be received from sources external to the application 100. For example, a client 110 or a cloud 112 might be providing UI updates asynchronously to the application 100. The client 110 might be another application or process executing on the same computing device as the application 100, or it might be executing on another computing device having an instance of the application 100, in which case the UI updates are received via a network. Similarly, the cloud 112 might be providing updates to the application 100 via a network.

The client 110, cloud 112, or other source provides to the application 100 updates corresponding to semantic alterations to the user interface 104. Such updates may be a result of user changes to another instance of the application 100 or they may be a result of other occurrences such as software updates issued by a software developer, content updates from a content provider, and so forth. Nearly any type of information can potentially affect the user interface 104.

The application 100 may receive such updates and handle the updates with a controller 114. The controller 114 may be designed to handle asynchronous communications, update the UI state 106, and otherwise provide straight-forward management and synchronization tasks. In one embodiment, the controller 114 may handle updates or instructions 116 from the application 100 as well as asynchronous remote updates. In another embodiment the controller 114 manages only remote updates and the application 100 separately handles its own internal UI updates; either or both may write to the UI state 106 as needed.

It may be seen that the application 100 when executing and operated by a user 118 may be subject to disruptions of the user's 118 activity when external UI-affecting updates are received. For instance, if an update is received to delete a user interface element while the user 118 is manipulating or interacting with the user interface element with an input device, then potentially the user's 118 input may become misdirected (e.g., a click intended for the deleted element might end up being applied to another element), mooted, etc. The user 118 may become confused or frustrated.

Figure 2:
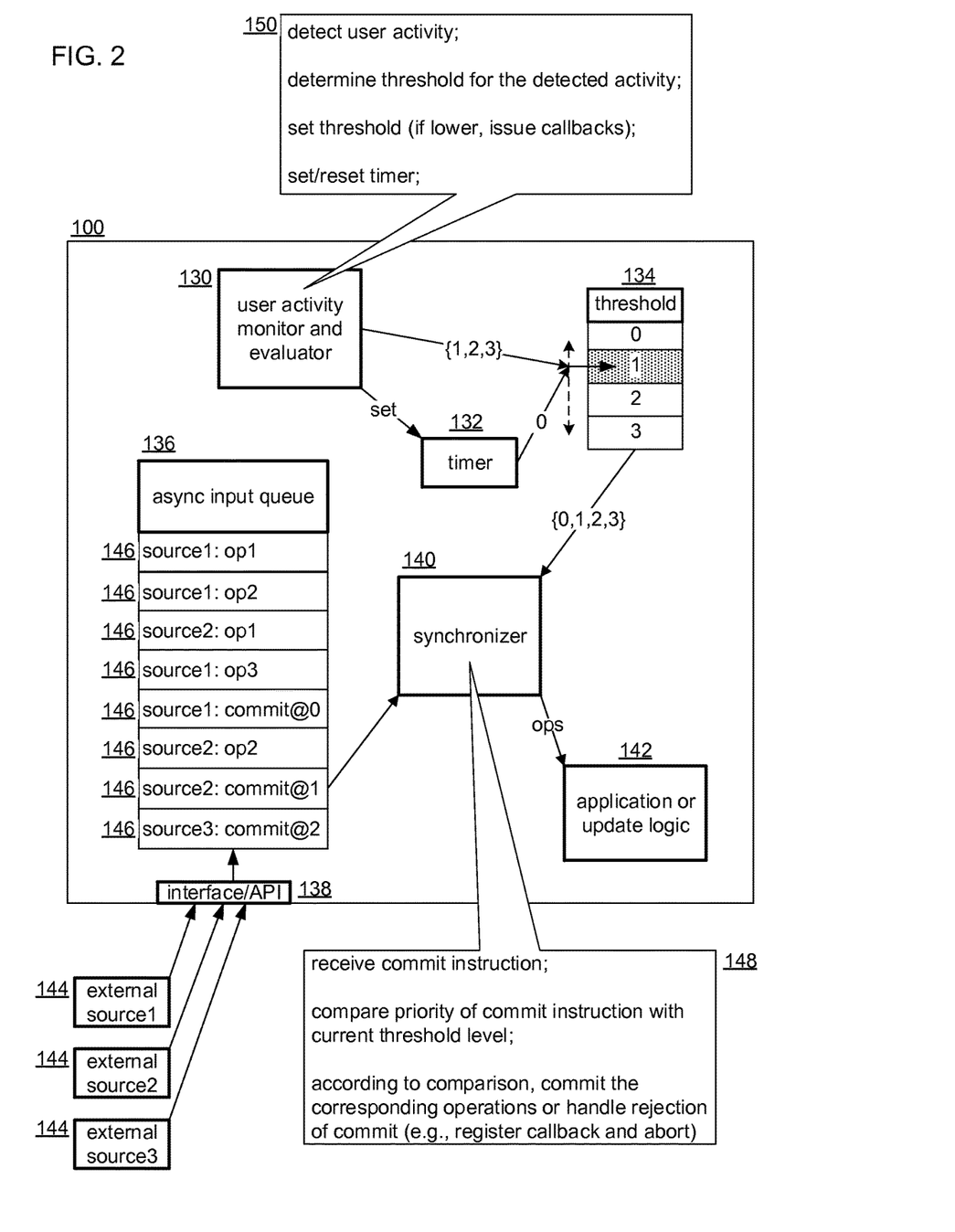
FIG. 2 shows an embodiment for using user interaction with the application or its host computing device to determine how to handle external updates affecting the user interface.

FIG. 2 shows an embodiment for using user interaction with the application 100 or its host computing device to determine how to handle external updates affecting the user interface 104. The application 100 may have a user activity monitor 130, a timer 132, a dynamically changing priority threshold 134, an input queue 136, an application programming interface (API) 138, a synchronizer 140, application logic 142, or other components to be described later, as well as components discussed with reference to FIG. 1.

External sources 144 pass UI updates or operations 146 through the API 138 to the application 100. Any known synchronization protocol or system may be used with modifications described herein. The UI operations 146 need not directly control UI features of the application but rather may be any operations pertinent to the application. However, it is assumed that some operations 146 will directly or indirectly affect the state of the user interface 104 when implemented by the application 100. In addition, the UI operations 146 may be implemented in transactional fashion. An external source 144 may provide operations that are queued in the input queue 136 until a commit operation is sent by the corresponding external source 144.

Because the external sources 144 are best able to judge the nature and importance of their operations 146 the external sources 144 include priority information with a commit operation. As seen in FIG. 2, the example commit operations have priorities such as "0", "1", "2", etc. These priorities are provided by the corresponding external sources 144. Such priorities may be determined by the external sources 144 by any means and may correspond to importance of content, likelihood of disrupting the user, likelihood of bearing on other aspects of the application 100, relationship to interactivity of the user interface 104, and so on. The basis for the priority is not significant. Note also that while a transactional approach is described other approaches may be used. If all operations are atomic then each operation may have its own priority. In addition, the application 100 may assume a default priority if none is provided by the corresponding external source.

When a commit operation is received the synchronizer 140 performs a process 148 to handle the commit operation. The synchronizer 140 compares the priority of the commit operation with the current level of the threshold 134. For example, when the "source2" commit operation (having priority "1") is processed the synchronizer 140 compares that priority with the current threshold 134 (also "1") and determines that the commit operation as sufficient priority to be implemented. Consequently process 148 commits the operations for the corresponding source 144 (e.g., "source2").

Committing may be implemented in a number of ways. In one embodiment, UI operations 146 are committed by the application processing the operations as though produced internally. In another embodiment, the application may have logic such as application logic 142 that processes the UI operations 146 by updating the UI state 106 as indicated by the operations UI operations 146. In this case, the application 100 may periodically refresh the user interface 104 by periodically checking for changes to the UI state 106 and updating the user interface 104 per the UI state 106.

In the case where process 148 determines that a commit does not have sufficient priority, then the synchronizer does not implement the corresponding UI operations 146. A commit rejection may be handled in different ways. In one embodiment, the commit operation and corresponding UI operations are removed from the input queue 136 and the corresponding external source 144 is notified of the rejection. In another embodiment, the synchronizer 140 may simply wait a predetermined time (perhaps linked to the commit priority) and again check the current level of the threshold 134. In yet another embodiment the synchronizer 140 removes the commit operation from the input queue 136 and registers a callback for the corresponding external source 144. Later, when the current level of the threshold is lowered the callback is invoked and the external source receives, via the API 138, a notification, thus allowing the external source to submit another commit operation.

In addition to handling synchronization information from the external sources 144, the application 100 also manages the threshold level 134. In concept, the application 100 uses indicia of the user's activities to dynamically adapt the threshold level 134. The application may have a monitor 130 that receives information when the user interacts with the application 100 (typically, via the user interface 104). User activity may be detected with known techniques such as using hooks for receiving windowing events, receiving user input events, receiving notifications from the application 100 when the application 100 receives user input, communicating with an operating system service, listening for events generated by or for user interface elements 108, and others. In sum, the application 100 senses and evaluates user activity.

The monitor 130 performs a process 150 involving, detecting user activity, determining the threshold level for the detected activity, setting the current threshold level 134, possibly issuing callbacks if the level has been lowered, and setting or resetting the timer 132. The threshold level 134 for activity can be determined according to properties of the activity, duration of the activity, parts of the user interface 104 that are related to the activity, the type of input device being used, the type of user interaction being performed (e.g., dragging, typing, selecting, etc.), which content is affected by the activity, or any other information related to the user's activity. When the threshold level for activity is determined the current threshold level 134 is set to the determined level.

Because some user activity may involve a sequence of discrete but rapid and related inputs (e.g., a sequence of clicks for a particular task), the timer 132 may be used to provide an activity "blockout" window. Each time a user activity or interaction is detected the timer 132 is set (or reset) to a window time such as two seconds. Thus the timer expires when no monitored user activity or interaction has been detected during the time window (or at least none that is evaluated as affecting the threshold level 134). For example, if the user is inputting a stroke when the stroke is complete the timer runs for two seconds but is reset if after one second the user inputs a click. If and when the timer 132 expires the current threshold level 134 is set by the timer 132 to the default lowest level corresponding to "no activity". In the example of FIG. 2, the level is set to "0" (with "3" being the highest priority level). Other values and ranges may be used.

To summarize, the application 100 is receptive to UI updates from external sources. Those sources may prioritize their updates. The application monitors user interactions and dynamically adapts a threshold level. When the user is active (and possibly for a short window thereafter) the application may ignore or defer external updates. Depending on the nature of the user's interactions and the priorities of the updates, the updates may or may not be applied. Thus, user's tasks and actions may be safeguarded against some disruptions. In one embodiment, the threshold level 134 has only a binary value of "on" and "off". In this case, all external updates may be blocked when a user is active. Moreover, by providing callbacks to the external sources rejections of updates can be handled by the external sources without overburdening the application or its host.

Figure 3:
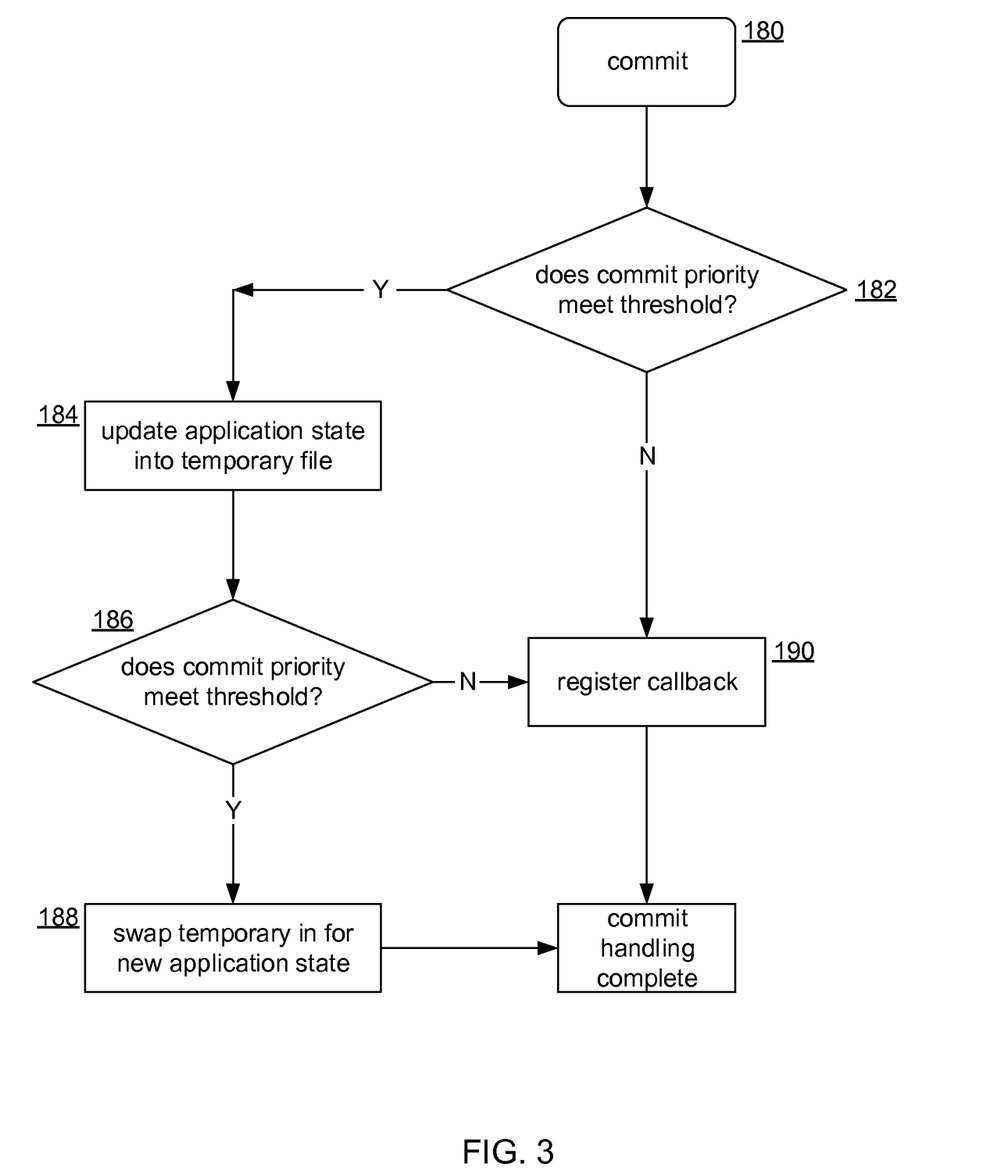
FIG. 3 shows a process for handling commit operations.

FIG. 3 shows a process for handling commit operations. When a commit 180 is received there is an evaluation at step 182 to determine if the commit meets the current threshold level 134. If the threshold is met then a two-phase commit may be used. At step 184 the application state (e.g., UI state 106) is copied to a temporary file or store and the temporary copy is updated with the UI updates corresponding to the approved commit request. When step 184 is complete the current priority threshold level 134 is again checked at step 186 against the commit's priority to make sure that during the time when the updates were applied the user has not begun some activity or interaction that should not be interrupted due to external updates. If at step 186 it is determined that the threshold of the commit is sufficient then at step 188 the updates are committed. For example, the temporary copy of the updated application or UI state replaces the active copy in use by the application 100.

Returning to steps 182 and 186, if in either instance the commit's priority is insufficient then at step 190 a callback is registered for the external source that submitted the commit 180. When the threshold level 134 is lowered the callback is invoked and the external source receives notice that might least the external source to again submit a commit request. In addition, when the callback is registered the external source may be notified.

Figure 4:
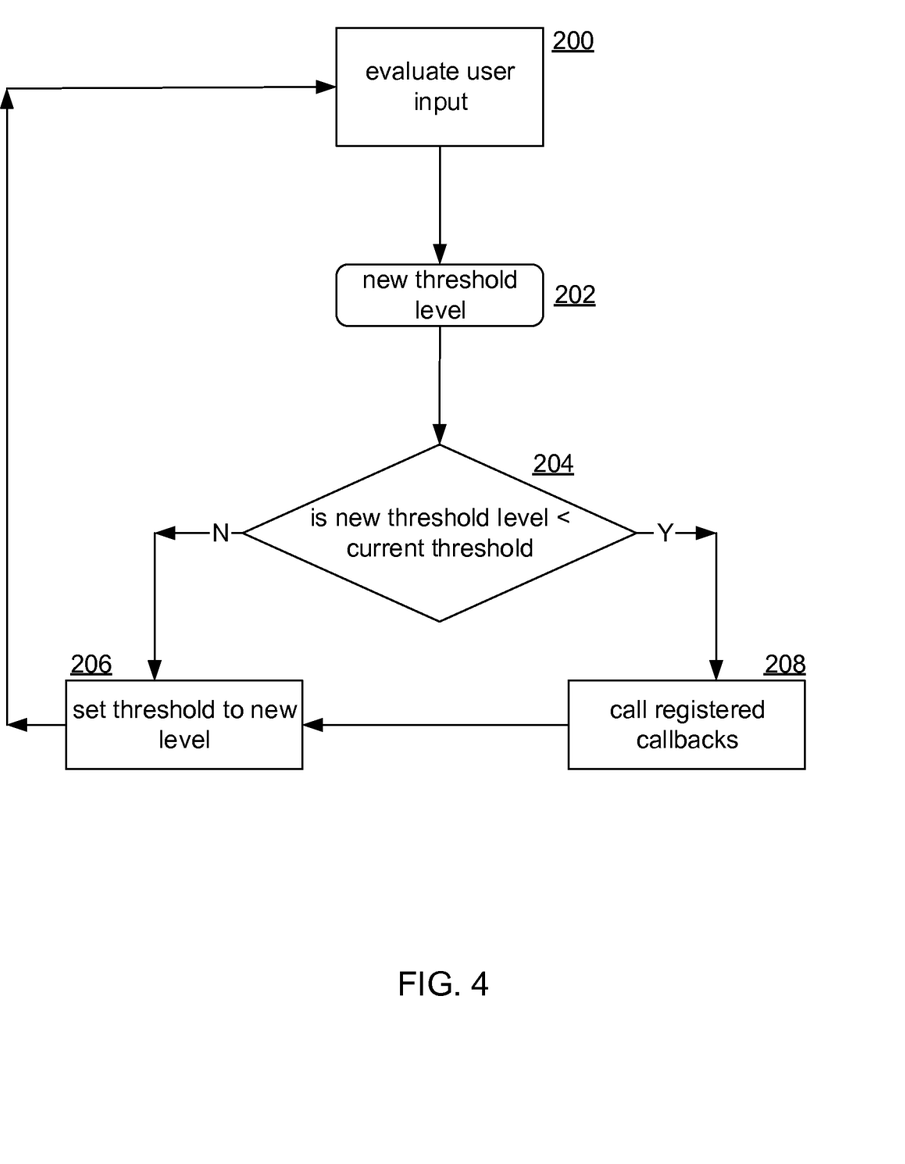
FIG. 4 shows a process for threshold updating.

FIG. 4 shows a process for threshold updating. At step 200 user input or interaction is evaluated. As discussed above, the nature of the input or interaction may be used to determine the new threshold level 202. Mapping information may be used to map inputs to threshold levels. For instance, a table of input types may be used, with each input type having a threshold level; different input types or interactions map to different threshold levels. At step 204 the new threshold is evaluated against the current threshold level. If the new threshold is lower then at step 206 the current threshold level 134 is updated with the new threshold level 202. Otherwise, at step 208 any registered callbacks are invoked thus notifying external sources that the update threshold has been lowered and UI updates might be applied if a new commit is attempted (in some cases, external sources may merely abandon their update attempts). If callbacks are used changes waiting to commit to the application aren't re-attempted until the priority bar is reduced and changes are not lost due to being blocked. For compatibility with an existing synchronization framework the prioritization can be an optional mechanism and external sources may continue to use unprioritized updates if desired.

While any generic application or user interface software can use the embodiments described herein, an example of such software is an application launcher program. The user interface of an application launcher is often central to a computing device, and may be used by a user for tasks such as launching applications, controlling execution of applications, installing and uninstalling applications, adding application icons, rearranging application icons, accessing lists of active or recently used applications, searching for applications, configuring settings, setting background images, and so on. A user may have two devices both hosting instances of the same application and linked in some way. State of the application launcher may be stored in a cloud service or directly exchanged between devices. With embodiments described above a user using the application launcher user interface on one device may be less likely to have their interactions interrupted by updates from the other device.

When a remote operation is locally applied, there may be a chance that a user interaction with the local application is disrupted or misdirected. Consider a case where a user decides to launch an application and so begins, for example, moving a pointer toward a user interface element to select the element. At the same time an operation might be applied that changes the layout of the user interface. Consequently, due to close timing of the user interface change, the user directs input intended for the element to another element such as an application launcher (e.g., an application tile or icon). Because unexpected application launches are particularly disruptive, and because some misdirected input can be accidentally destructive, it may be helpful to, provide a short blocking window each time an operation from a remote source is applied (or for only particular such operations). The blocking window might be around 250 milliseconds. During the blocking window, measures such as ignoring user input, ignoring or blocking application launches, ignoring input in certain regions, etc., may be used to help avoid misdirection of user input. In addition to a blocking window, other techniques may be used. For example, a next activity by the user might be blocked or disregarded. In addition, it may be helpful to selectively block or disregard user activity only for certain types of operations or only for certain types of sources that provided the operations. For instance, if a roaming or background source provided an operation then the likelihood of a misdirected input is increased.

Figure 5:
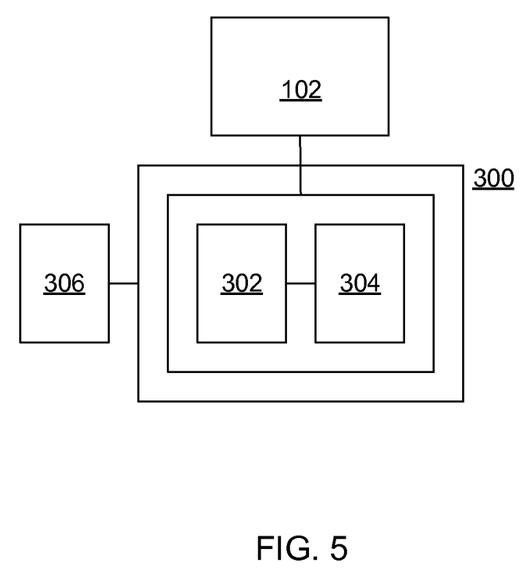
FIG. 5 shows an example of a computing device on which embodiments described herein may be implemented.

FIG. 5 shows an example of a computing device 300 on which embodiments described above may be implemented. The computing device 300 may have the display 102 for displaying user interfaces, as well as storage 302 and a processor 304. These elements may cooperate in ways understood in the art of computing. In addition, input devices 306 may be integrated with or in communication with the computing device 300. The display 102 may be a touch-sensitive display that also functions as an input device. The computing device 300 may have any form factor or be used in any type of encompassing device. For example, touch-sensitive control panels are often used to control appliances, robots, and other machines. The computing device 300 may be in the form of a handheld device such as a smartphone, a tablet computer, a gaming device, a server, or others.

Embodiments and features discussed above can be realized in the form of information stored in volatile or non-volatile computer or device readable devices. This is deemed to include at least devices such as optical storage (e.g., compact-disk read-only memory (CD-ROM)), magnetic media, flash read-only memory (ROM), or devices for storing digital information. The stored information can be in the form of machine executable instructions (e.g., compiled executable binary code), source code, bytecode, or any other information that can be used to enable or configure computing devices to perform the various embodiments discussed above. This is also deemed to include at least volatile memory such as random-access memory (RAM) and/or virtual memory storing information such as central processing unit (CPU) instructions during execution of a program carrying out an embodiment, as well as non-volatile devices storing information that allows a program or executable to be loaded and executed. The embodiments and features can be performed on any type of computing device, including portable devices, workstations, servers, mobile wireless devices, and so on.

The invention claimed is:

1. A method performed by an application executing on a computing device, the computing device comprising an input device and a display, the application comprising a graphical user interface (GUI) comprising a plurality of graphic objects displayed on a display of the computing device, the application further comprising user interface (UI) configuration data managed and stored by the application, the graphic objects displayed according to the UI configuration data, the method comprising:
   controlling, by the application, layout and/or appearance of the graphic objects of the GUI according to the UI configuration data;
   while the GUI is displayed, dynamically adjusting a threshold to different levels by monitoring user interactions with the GUI via the input device and setting the threshold to the different levels according to the user interactions with the GUI;
   while the GUI is displayed and the user interactions with the GUI are continuing, receiving UI synchronization operations configured to change the UI configuration data of the GUI to correspond with another instance of the GUI, the UI synchronization operations received from a source other than the application, each UI synchronization operation having a respective priority specific to that UI synchronization operation; and
   while the GUI is displayed, automatically determining whether to implement the UI synchronization operations by comparing the threshold to the priorities, wherein some of the synchronization operations satisfy the threshold and based thereon are implemented while the GUI is displayed, and some of the synchronization operations do not satisfy the threshold and based thereon are not implemented or are deferred.

2. A method according to claim 1, further comprising identifying types of the user interactions, and the dynamically adjusting the threshold according to the user interactions comprises setting the levels of the threshold according to the identified types.

3. A method according to claim 1, further comprising setting a timer each time a user interaction is detected, and when the timer expires setting the threshold to a default level.

4. A method according to claim 3, wherein the default level is lower than the UI synchronization operation priorities and thereby allows all of the operations to be implemented.

5. A method according to claim 1, wherein some of the UI synchronization operations comprise commit operations, each commit operation comprising a priority, the method further comprising responding to a commit operation by comparing the corresponding priority to the threshold to determine whether the commit operation will be performed or not.

6. A method according to claim 1, further comprising invoking a callback associated with the source when the threshold is determined to have been lowered.

7. A computer readable hardware storage device storing information to enable a computing device to perform a process, the process comprising:
   executing an application on the computing device, the application generating a user interface that is displayed on a display of the computing device;
   while the application is executing and the user interface is displayed, monitoring user interaction with the computing device and when interactions are detected setting a threshold level, wherein the threshold level changes to different values according to whether the user is interacting with the computing device;
   receiving updates via a network from an external source, each update having a respective priority, the updates configured to be applied by the application to modify layout and/or appearance of the user interface while the user interface is being displayed;
   providing the received updates to the application; and
   while the application is executing and the user interface is displayed, determining, by the application, whether to apply the provided updates by comparing the priorities of the received updates to the threshold level, wherein some updates are applied by the application on the basis of having been determined to have sufficient priority relative to the threshold level and some updates are deferred or not applied by the application on the basis of having been determined to have insufficient priority relative to the threshold level.

8. A computer readable hardware storage device according to claim 7, wherein the application has configuration data that controls the layout and/or appearance of the user interface, and when a given update is determined to be applied the given update is first applied to the configuration data and then the priority of the given update is again compared to the threshold level before allowing the application to act on the updated configuration data.

9. A computer readable hardware storage device according to claim 7, further comprising receiving the updates from another computing device that has an instance of the user interface and the updates were generated and sent in response to modifications to the instance of the user interface.

10. A computer readable hardware storage device according to claim 9, wherein the application comprises an application launcher that allows a user to launch applications on the computing device.

11. A computer readable hardware storage device according to claim 7, wherein the monitoring comprises evaluating the user interactions to determine the different threshold levels, wherein some interactions cause a first threshold level to be set and other interactions cause a second threshold level to be set.

12. A computer readable hardware storage device according to claim 7, wherein a callback is registered when a given update is not applied to due to the corresponding priority, and when the threshold level is lowered the callback is called to notify a source that provided the given update.

13. A computer readable hardware storage device according to claim 7, further comprising setting a timer responsive to detecting a user interaction and reverting the threshold level responsive to the timer expiring.

14. A computing device comprising a processor, an input device, a display, and storage, the computing device further comprising:
   the storage storing an application program that is executed by the processor;
   the application program configured to, while executing:
      display a user interface on the display and receive indications of user interactions with the application program;
      dynamically adjust a threshold level according to the indications of the user interactions with the computing device;
      receive, from a source external to the application program, update operations configured to be applied by the application program while still executing to modify behavior or appearance of the user interface, each update operation having a respective priority that was set by the external source; and
      determine, for each update operation, whether to implement the operation according to the threshold level and according to the operation, wherein whether the operation will be implemented by the application program depends on whether the priority of the update operation is determined to be sufficient relative to the threshold level.

15. A computing device according to claim 14, wherein each time the user interacts with the application program there is a time window started that prevents update operations without sufficient priority from being implemented for the application program.

16. A computing device according to claim 14, wherein the threshold varies responsive to different of the user interactions such that some user interactions will prevent some update operations from being implemented but will allow other update operations to be implemented.

17. A computing device according to claim 14, wherein, when the application program applies a given update operation, user input or a particular user action is blocked or disregarded responsive to the application program applying, or deciding to apply, the given update operation.

18. A computing device according to claim 17, wherein different types of external sources provide the update operations, and the application program determines whether to perform the blocking or disregarding for the given update operation according to the type of the external source that provided the given update operation.

19. A computing device according to claim 17, wherein the blocking or disregarding is performed for a predetermined time window.

* * * * *